United States Patent Office 3,479,323
Patented Nov. 18, 1969

3,479,323
ADHESIVES FROM OLEFINICALLY UNSATU-
RATED POLYESTERS AND POLYTHIOLS
Faber B. Jones, Bartlesville, Okla., assignor to Phillips
Petroleum Company, a corporation of Delaware
No Drawing. Filed Oct. 10, 1966, Ser. No. 585,240
Int. Cl. C08g 17/12, 33/10; C09j 3/16
U.S. Cl. 260—75                                   8 Claims

ABSTRACT OF THE DISCLOSURE

Olefinically unsaturated polyesters of polyhydric alcohols or phenols are contacted with a polythiol for a time sufficient to form an adhesive composition in the absence of an oxidizing atmosphere, and in the presence of an amine salt. The novel composition of matter which results is useful as an adehsive.

This invention relates to a new adhesive composition, and to a method of making said composition.

In another aspect, the invention relates to a method of making a novel adhesive composition by heating a mixture comprising a carboxy-terminated, olefinically unsaturated polyester, a polythiol, and an amine salt, in the absence of an oxidizing atmosphere, for a time sufficient to form an adhesive, and at a temperature sufficiently high to form the corresponding amine from said salt.

In another of its aspects, the invention relates to a novel adhesive composition comprising the reaction product of a carboxy-terminated, olefinically unsaturated polyester and a polythiol, said reaction product being formed in the presence of an amine generated from an amine salt, wherein said reaction product is free from disulfide linkages.

In another of its aspects, the invention relates to the promotion of a reaction between a carboxy-terminated, olefinically unsaturated polyester and a polythiol by heating said polyester and said polythiol in the presence of an amine salt, and in the absence of an oxidizing atmosphere, for a time sufficient to form an adhesive, wherein the temperature employed is sufficiently high to form the corresponding amine from said amine salt.

In another of its aspects, the invention relates to a composition of matter comprising an inhibited adhesive-yielding mixture comprising a carboxy-terminated, olefinically unsaturated polyester, a polythiol, and an amine salt, and not containing compounds having disulfide linkages.

In Ser. No. 579,205, filed Sept. 14, 1966, a new adhesive composition and a method of making same are disclosed. Briefly, the invention in that application comprises the contacting of a mixture comprising an olefinically unsaturated polyester, a polythiol, and a base, in the absence of an oxidizing atmosphere, for a time sufficient to form the adhesive. Ordinarily, the base, which serves as an accelerator in the formation of the adhesive, is added to the mixture of polyester and polythiol just prior to use. The pot life, even at room temperature, of some of these mixtures containing accelerators is quite short, with the gel time measured in minutes.

It is an object of this invention to inhibit premature gelation of an uncured adhesive composition. It is also an object of this invention to provide a composition of matter suitable for use as an adhesive or coating which can be maintained in an uncured condition for an extended period of time without detrimental effects upon the adhesive. Another object of the invention is to provide an uncured adhesive composition that is stable at room temperature, but cures rapidly when heated to a temperature sufficiently high to activate an inhibited accelerator in said composition.

Other aspects, objects, and the several advantages of this invention will be apparent to one skilled in the art upon a reading of this disclosure and the appended claims.

In accordance with the invention, a mixture comprising a carboxy-terminated, olefinically unsaturated polyester, a polythiol, and an amine salt is heated for a time sufficient to form an adhesive composition, in the absence of an oxidizing atmosphere. Said mixture is stable at room temperature for prolonged periods of time and must be heated to a temperature sufficiently high to form the corresponding amine from the amine salt. Once formed, the amine serves to accelerates the crosslinking process. Exclusion of an oxidizing atmosphere is important to the process of this invention because the presence of oxygen, or any gas containing oxygen, tends to oxidize the mercapto groups to disulfide linkages, which diminishes the adhesive properties of the composition.

The stability of the novel formulations prior to heating makes possible their preparation far in advance of their use, thus permitting storage and shipment of premixed formulations. The user is not required to add any additional materials to this composition.

The carboxy-terminated, olefinically unsaturated polyester which forms one component of the adhesive composition can be prepared by contacting an olefinically unsaturated polycarboxylic acid or its anhydride with a polyhydric alcohol or phenol. When the carboxy-terminated, olefinically unsaturated polyester is produced in a one-step process, the olefinically unsaturated polycarboxylic acid or its anhydride should be employed in an amount at least sufficient to give a polyester substantially free of hydroxy groups. Thus, the mole ratio of olenfinically unsaturated polycarboxylic acid or its anhydride to polyhydric alcohol or phenol with generally be within the range of about 1.05:1 to about 1.2:1, usually being about 1.1:1. An esterification catalyst such as benzenesulfonic acid or p-toluenesulfonic acid can be employed. If deisred, a free radical scavenger such as hydroquinone or 4-tert-butylcatechol can be added to prevent gelation by free radical polymerization at the olefinic double bonds during preparation of the carboxy-terminated, olefinically unsaturated polyester. The reaction can be carried out in the absence of a solvent, or it can be carried out in an aromatic or saturated paraffinic or cycloparaffinic solvent such as benzene, toluene, xylenes, heptane, octane, decane, cyclohexane, or the like. The carboxy-terminated, olefinically unsaturated polyester is readily prepared by carrying out the esterification at a temperature within the range of about 80–250° C. for a period of time which is usually within the range of about 10 minutes to about 12 hours, preferably in an atmosphere substantially free of oxygen.

Alternatively, the carboxy-terminated, olefinically unsaturated polyester can be prepared from an olefinically unsaturated polyester having as end groups both hydroxy and carboxy groups, or from an olefinically unsaturated polyester having end groups which are substantially all hydroxy groups, by esterification with polycarboxylic acids of their anhydrides, with or without olefinic unsaturation. Examples of some suitable polycarboxylic acids and anhydrides are listed below.

Although olefinically unsaturated polycarboxylic acids and their anhydrides in general are applicable in the preparation of the carboxy-terminated, olefinically unsaturated polyesters, the preferred acids and anhydrides have 4 to about 12 carbon atoms. Examples of some of the preferred olefinically unsaturated polycarboxylic acids and their anhydrides include Maleic anhydride
Maleic acid Fumaric acid
Itaconic acid
Itaconic anhydride
Mesaconic acid
Dimethylfumaric acid
Cis-muconic acid
Trans-muconic acid
Citraconic acid
Citraconic anhydride
Phenylmaleic acid
Cyclopentylmaleic acid
6-dodecenedioic acid
3-cyclohexene-1,2-dicarboxylic acid and the like, and mixtures thereof. If desired, other polycarboxylic acids and anhydrides such as Succinic acid
Succinic anhydride
Glutaric acid
Adipic acid
Sebacic acid
Dodecanedioic acid
1,4-cyclohexanedicarboxylic acid
Terephthalic acid
Isophthalic acid
Phthalic acid
Phthalic anhydride and the like, and mixtures thereof, can be employed with the olefinically unsaturated polycarboxylic acids and anhydrides.

Although polyhydric alcohols and phenols in general are applicable in the preparation of the carboxy-terminated, olefinically unsaturated polyesters, the preferred polyhydric alcohols and phenols are those having 2 to about 15 carbon atoms. Other substituents can be present provided they do not interfere with the formation of the adhesives of the invention. Examples of some polyhydric alcohols and phenols which can be employed include

| | |
|---|---|
| Glycerine | Nonamethylene glycol |
| Erythritol | Undecamethylene glycol |
| Pentaerythritol | Pentadecamethylene glycol |
| Arabitol | Isobutylene glycol |
| Xylitol | 2,2-dimethyltrimethylene |
| Adonitol | glycol |
| Mannitol | 1,2-butanediol |
| Dulcitol | 1,3-butanediol |
| Sorbitol | 3-methyl-1,3-butanediol |
| Pentaglycerine | 2,3-butanediol |
| Xylene glycols | Pinacol |
| Ethylene glycol | 2-ethyl-1,3-hexanediol |
| Diethylene glycol | Catechol |
| Triethylene glycol | Resorcinol |
| Tetraethylene glycol | Hydroquinone |
| Pentaethylene glycol | 4,4'-dihydroxybiphenyl |
| Trimethylene glycol | 4,4'-isopropylidenediphenol |
| Tetramethylene glycol | | and the like, and mixtures thereof.

Although it is presently preferred that the carboxy-terminated, olefinically unsaturated polyesters be prepared as described above, it is within the scope of this invention to employ carboxy-terminated, olefinically unsaturated esters prepared in other ways. For example, the carboxy-terminated, olefinically unsaturated polyester can be prepared by the reaction of an olefinically unsaturated polyhydric alcohol such as 2-butene-1,4-diol, 1-hexene-3,4-diol, 1-decene-4,5,6-triol, 2-cyclohexene-1,4-diol, and the like, with a polycarboxylic acid or its anhydride, with or without olefinic unsaturation, such as those described above. Thus, carboxy-terminated polyesters in general which possess olefinic unsaturation can be employed, regardless of their manner of preparation.

Although polythiols of higher molecular weight can be used in the reaction with the carboxy-terminated, olefinically unsaturated polyesters to give useful adhesive compositions, the preferred polythiols have 2 to about 20 carbon atoms, more desirably having 3 to about 20 carbon atoms. The number of mercapto groups in the polythiol molecule is preferably within the range of 2 to 6, more desirably 3 or 4. The mercapto groups of the polythiol can be attached to a hydrocarbon radical selected from the group consisting of saturated aliphatic, saturated cycloaliphatic, and aromatic radicals and combinations thereof such as aryl-substituted aliphatic radicals, alkyl-substituted aromatic radicals, and the like. Additionally, the polythiol molecule can contain other groups or linkages such as ester groups, ether linkages, monosulfide linkages, or the like which do not interfere with the reaction of the polythiol with the carboxy-terminated, olefinically unsaturated polyester to give a desired adhesive composition. Examples of polythiols suitable for use in accordance with the invention include 1,2-ethanedithiol,
1,2,3-propanetrithiol,
1,2,4-butanetrithiol,
1,2,3,4-butanetetrathiol,
1,2,3-pentanetrithiol,
3-methyl-1,2,3-heptanetrithiol,
1,2,10-decanetrithiol,
1,2,3,5,6-dodecanepentathiol,
1,2,4,5,7,8-hexadecanehexathiol,
2,3,5,8-eicosanetetrathiol,
1,2,3-cyclopentanetrithiol,
1,2,3,4-cyclohexanetetrathiol,
2-ethyl-1,2,3,4-cyclooctanetetrathiol,
3-(2-mercaptoethyl)cyclohexanethiol,
4-(2-mercaptoethyl)cyclohexanethiol,
2-cyclohexyl-1,3,4-butanetrithiol,
1,2,3-benzenetrithiol,
1,2,4,5-benzenetetrathiol,
Toluene-2,3,4-trithiol,
Toluene-α-2,3,4-tetrathiol,
2-phenyl-3,6-hexanetrithiol,
Tris(mercaptoacetate) of glycerine,
Tris(3-mercaptopropionate) of glycerine,
Tetrakis(3-mercaptopropionate) of pentaerythritol,
Bis(2-mercaptoethyl) ether,
Bis(3-mercaptopropyl)monosulfide, and the like, and mixtures thereof.

The amine salt which serves as a source of the free amine upon heating the adhesive formulation can be added as such or it can be produced in situ by adding a free amine to the carboxy-terminated, olefinically unsaturated polyester, thereby producing an amine salt of the acidic polymer. Although any amine can be used, those preferred have 1 to about 24 carbon atoms, more desirably having about 3 to about 18 carbon atoms. The amines can be primary, secondary, or tertiary amines, and they can be saturated aliphatic, saturated cycloaliphatic, aromatic, or heterocyclic amines. Examples of some suitable amines include

| | |
|---|---|
| Methylamine | N-methylbutylamine |
| Propylamine | Dibenzylamine |
| Trimethylamine | Tribenzylamine |
| Triethylamine | N,N-dimethylaniline |
| Tripropylamine | N,N-diethylaniline |
| Tributylamine | Cyclopentylamine |
| Triamylamine | Pyridine |
| Trihexylamine | Quinoline |
| Trioctylamine | α-Naphthylamine |
| Dipropylamine | N,N-dicyclohexylpiperazine |
| Dibutylamine | Piperidine |
| Diamylamine | Ethylenediamine | and the like, and mixtures thereof. Suitable amine salts which can be employed include salts of amines, described and listed above, and inorganic and organic acids. Thus, the above amines can be employed, e.g., as the hydrochloride, hydrobromide, hydriodide, sulfate, acetate, propionate, butyrate, valerate, isovalerate, oxalate, succinate, benzoate salicylate, phthalate, isophthalate, terephthalate, and the like.

Although the ratio of polythiol to carboxy-terminated, olefinically unsaturated polyester used in the preparation of the adhesive compositions of this invention can vary over a considerable range, the polythiol will generally be used in an amount such as to provide about 0.5–2 mercapto groups for each olefinic double bond in the quantity of polyester employed, preferably being used in an amount such as to provide about 1 mercapto group for each olefinic double bond in the quantity of polyester employed. The weight ratio of amine or amine salt to the combination of polythiol and polyester will generally be within the range of about 0.001:1 to about 0.06:1, usually being within the range of about 0.002:1 to about 0.04:1. When a free amine is employed, the amount of amine used should not exceed that which would be theoretically required to react with the carboxy groups in the quantity of polyester employed. The curing process is generally carried out at temperatures within the range of about 50° C. to about 250° C., usually within the range of about 65° C. to about 160° C. The period of time required for curing will vary over a wide range, depending in part on the temperature, but will generally be within the range of about 1 minute to about 1 week, usually being within the range of about 10 minutes to about 24 hours.

EXAMPLE

Three olefinically unsaturated polyesters were prepared and evaluated as components of adhesive formulations. Each of these olefinically unsaturated polyesters contained within the polymer molecule recurring units having the structure

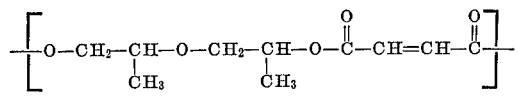

These three olefinically unsaturated polyesters are herein designated as polyester I, polyester II, and polyester III, each of the polyesters differing with respect to the end groups of the polymer molecule. For the most part, the molecule of polyester I had as end groups one carboxy group and one hydroxy group. In contrast, substantially all of the molecules of polyester II had two hydroxy groups as end groups, and substantailly all of the molecules of polyester III had two carboxy groups as end groups.

In the preparation of polyester I, 500 ml. of toluene containing 309 g. (3.1 moles) of maleic anhydride, 430 g. (3.1 moles) of dipropylene glycol, 9.5 g. (0.06 mole) of p-toluenesulfonic acid, and 0.7 g. of hydroquinone were refluxed at atmospheric pressure, under a nitrogen atmosphere, for 4 hours and 50 minutes. Water produced during the polymerization was removed azeotropically during the heating period. Toluene was then removed by distillation under reduced pressure. The residual product (polyester I) was a viscous, clear, light straw-colored liquid having a molecular weight of 1140 as determined by vapor pressure osmometry, and an acid number of 46 mg. KOH/g. polymer.

In the preparation of polyester II, 350 ml. of toluene containing 197.2 g. (2.0 moles) of maleic anhydride, 281.5 g. (2.1 moles) of dipropylene glycol, 6.9 g. (0.04 mole) of p-toluenesulfonic acid, and 0.5 g. of hydroquinone was refluxed at atmospheric pressure, under a nitrogen atmosphere, for 6 hours. Water produced was removed azeotropically during this heating period. Then 26.0 g. (0.2 mole) of dipropylene glycol was added, and the mixture was refluxed an additional 6 hours, during which time water produced was removed azeotropically. The resulting mixture was washed with water and then with dilute sodium bicarbonate to remove any free acids. Toluene was removed from the washed mixture by distillation under reduced pressure. The residual product (polyester II) was a viscous, clear, straw-colored liquid having a molecular weight of 1500 as determined by vapor pressure osmometry, and an acid number of 0.02 mg. KOH/g. polymer.

In the preparation of polyester III, 150 ml. of toluene containing 103.0 g. (0.069 mole) of polyester II and 14.9 g. (0.15 mole) of maleic anhydride was refluxed at atmospheric pressure, under a nitrogen atmosphere, for 1 hour. The reaction mixture was then washed with water until the washings were neutral to litmus, after which toluene was removed by distillation under reduced pressure. The residual product (polyester III) was a viscous, clear, straw-colored liquid having a molecular weight of 1920 as determined by vapor pressure osmometry, and an acid number of 127 mg. KOH/g. polymer.

In the evaluation of polyesters I, II, and III as components of adhesive formulations, 20–25 g. quantities of a mixture of each of the polyesters and curative system therefor were allowed to stand at room temperature (about 25° C.), and the change in viscosity or onset of gelation as time progressed was visually observed. Bond strengths at room temperature were obtained from aluminum-to-aluminum lap shear specimens by the general procedure outlined in ASTM D1002–53T. The aluminum coupons were cleaned before use by a standard hot alkaline wash and sulfuric acid-chromate wash. The cure schedule for lap shear bond specimens was 16 hours at 75° C. followed by 3 hours at 150° C. The results are summarized in the following table.

TABLE

| Run Number | Polyester | Curative System* | Gel Time at Room Temperature | Lap Shear Strength, p.s.i. | Ultimate Bond Deformation, in. |
|---|---|---|---|---|---|
| 1 | I | 51.2 pphr. PTE | 8 days (approx.) | 90 | 0.040 |
| 2 | I | 51.2 pphr. PTE; 1.1 pphm. TBA | 7 days (considerable thickening after 3 days). | 2,450 | 0.055 |
| 3 | II | 51.2 pphr. PTE; 1.1 pphm. TBA | 10–15 minutes | 2,350 | 0.049 |
| 4 | II | 51.2 pphr. PTE; 1.1 pphm. TBA; 3.0 pphm. GAA. | 6–8 hours | 300 | 0.015 |
| 5 | III | 51.2 pphr. PTE; 1.1 pphm. TBA | >10 days | 2,100 | 0.046 |

*pphr. PTE=parts of tetrakis(3-mercaptopropionate) of pentaerythritol per hundred parts polyester.
pphm. TBA=parts of tributylamine per hundred parts of polyester-polythiol mixture.
pphm. GAA=parts of glacial acetic acid per hundred parts of polyester-polythiol mixture. The tributylamine and glacial acetic acid employed in run 4 were premixed and aged 24 hours before use.

In each of the above runs, the amount of the tetrakis (3-mercaptopropionate) of pentaerythritol employed was approximately the amount calculated to provide one mercapto group for each olefinic double bond in the polyester sample. In run 4 glacial acetic acid was employed in an amount calculated to be sufficient to convert the tributylamine to its acetate salt, with sufficient excess acetic acid to provide in the blend of polyester and curative system a number of carboxy groups approximately equal to that in the blend of polyester I and curative system (run 1).

The results shown in the above table illustrate the superiority of the adhesive formulation obtained in run 5 over that obtained in any of the other runs in achieving the objective of this invention, for the adhesive formulation of run 5, upon heating, provided a bond of high strength, this adhesive formulation nevertheless possessing a higher degree of stability at room temperature than was exhibited by any of the other formulations.

Treatment of polyester III with the tetrakis(3-mercaptopropionate) of pentaerythritol, in the absence of tributylamine, under the conditions of temperature and time employed in this series of runs, would have resulted in a composition having little or no bond strength.

Reasonable variation and modification are possible within the spirit and scope of the invention, the essence of which is a method of making a material suitable for use as an adhesive by heating a mixture comprising a carboxy-terminated, olefinically unsaturated polyester and a polythiol for a time sufficient to form the adhesive in the absence of an oxidizing atmosphere, and in the presence of an amine salt, and the composition of matter resulting from this method.

I claim:

1. A method of preparing an adhesive composition comprising heating a mixture comprising a carboxy-terminated, olefinically unsaturated polyester, which is the reaction product selected from the group consisting of (a) a compound selected from olefinically unsaturated polycarboxylic acids and anhydrides thereof with a compound selected from polyhydric alcohols and phenols in the presence of an esterification catalyst; (b) a compound selected from olefincially unsaturated polyesters having hydroxy and carboxy end groups, or olefinically unsaturated polyesters having substantially all hydroxy end groups, with a compound selected from polycarboxylic acids and anhydrides thereof in the presence of an esterification catalyst; and (c) olefinically unsaturated polyhydric alcohols with a compound selected from polycarboxylic acids and anhydrides thereof in the presence of an esterification catalyst; to yield said carboxy-terminated, olefinically unsaturated polyester, a polythiol having from about 2 to about 20 carbon atoms and from 2 to about 6 mercapto groups per molecule, the amount of said polythiol being sufficient to provide about 0.5 to about 2 mercapto groups per olefinic double bond in said polyester, and an amine salt, the weight ratio of said amine salt to said polythiol and polyester being in the range of from about 0.001:1 to about 0.06:1 for a time sufficient to form said adhesive, in the absence of an oxidizing atmosphere.

2. A method as defined in claim 1 wherein said amine salt is formed by adding a free amine to the carboxy-terminated, olefinically unsaturated polyester.

3. A method as defined in claim 1 wherein said amine salt is formed by contacting free amine salt with an acid selected from inorganic and organic acids.

4. A method as defined in claim 1 wherein the weight ratio of said amine salt to the combination of polythiol and polyester is within the range of from about 0.002:1 to about 0.04:1.

5. A composition of matter comprising an inhibited adhesive-yielding mixture comprising carboxy-terminated, olefinically unsaturated polyester, which is the reaction product selected from the group consisting of (a) a compound selected from olefinically unsaturated polycarboxylic acids and anhydrides thereof with a compound selected from polyhydric alcohols and phenols in the presence of an esterification catalyst; (b) a compound selected from olefinically unsaturated polyesters having hydroxy and carboxy end groups, or olefinically unsaturated polyesters having substantially all hydroxy end groups, with a compound selected from polycarboxylic acids and anhydrides thereof in the presence of an esterification catalyst; and (c) olefinically unsaturated polyhydric alcohols with a compound selected from polycarboxylic acids and anhydrides thereof in the presence of an esterification catalyst; to yield said carboxy-terminated, olefinically unsaturated polyester, a polythiol having from about two to about 20 carbon atoms and from about 2 to about 6 mercapto groups per molecule, the amount of said polythiol being sufficient to provide about 0.5 to about 2 mercapto groups per olefinic double bond in said polyester, and an amine salt, the weight ratio of said amine salt to said polythiol and polyester being in the range of from about 0.001:1 to about 0.06:1.

6. A composition of matter as defined in claim 5 wherein said amine salt is produced by adding a free amine to the carboxy-terminated, olefinically unsaturated polyester.

7. A composition of matter as defined in claim 5 wherein said amine salt is selected from salts of inorganic and organic acids.

8. A composition of matter as defined in claim 5 wherein said polyester comprises the reaction product of maleic anhydride and dipropylene glycol having two carboxy groups as end groups, said polythiol comprises tetrakis(3-mercaptopropionate) of pentaerythritol, and said amine salt is tributylamine acetate.

References Cited

UNITED STATES PATENTS

| | | | |
|---|---|---|---|
| 2,411,954 | 12/1946 | Burke | 260—225 |
| 2,681,901 | 6/1954 | Wiles et al. | 260—47 |
| 3,201,370 | 8/1965 | Butler et al. | 260—47 |
| 3,310,527 | 3/1967 | De Acetis | 260—47 |
| 3,369,040 | 2/1968 | De Acetis | 260—468 |

HAROLD D. ANDERSON, Primary Examiner

L. M. PHYNES, Assistant Examiner

U.S. Cl. X.R.

161—214; 260—47